(12) United States Patent
Bremm et al.

(10) Patent No.: US 7,832,201 B2
(45) Date of Patent: Nov. 16, 2010

(54) METHOD FOR REGENERATION A NITROGEN OXIDE STORAGE CATALYST

(75) Inventors: Stephan Bremm, Kahl (DE); Christian Manfred Tomanik, Reiskirchen (DE); Ulrich Goebel, Hattersheim (DE); Wilfried Mueller, Karben (DE); Thomas Kreuzer, Karben (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 109 days.

(21) Appl. No.: 11/722,149

(22) PCT Filed: Dec. 24, 2005

(86) PCT No.: PCT/EP2005/014030
§ 371 (c)(1),
(2), (4) Date: Jan. 8, 2009

(87) PCT Pub. No.: WO2006/069768
PCT Pub. Date: Jul. 6, 2006

(65) Prior Publication Data
US 2009/0151329 A1 Jun. 18, 2009

(30) Foreign Application Priority Data
Dec. 24, 2004 (DE) .................. 10 2004 062 596

(51) Int. Cl.
*F01N 3/00* (2006.01)
(52) U.S. Cl. .................. 60/295; 60/285; 60/286
(58) Field of Classification Search .................. 60/285, 60/286, 295
See application file for complete search history.

(56) References Cited

U.S. PATENT DOCUMENTS 5,806,304 A * 9/1998 Price et al. .................. 60/274

(Continued)

FOREIGN PATENT DOCUMENTS

DE 197 35 011 A1 2/1999

(Continued)

OTHER PUBLICATIONS

Translation of the International Preliminary Report on Patentability.

*Primary Examiner*—Thomas E Denion
*Assistant Examiner*—Michael Carton
(74) *Attorney, Agent, or Firm*—Smith, Gambrell & Russell, LLP

(57) ABSTRACT

To remove the nitrogen oxides from the exhaust gas from lean-burn engines, these engines are equipped with a nitrogen oxide storage catalyst, which has to be regenerated frequently by the engine being briefly switched to rich-burn mode. The regeneration is usually initiated when the nitrogen oxide concentration downstream of the catalyst rises above a permissible value. In this context, there is a risk of the bed temperature of the catalyst during and after regeneration being pushed into a range with incipient thermal desorption of the nitrogen oxides on account of the heat which is released during the conversion of the nitrogen oxides by the reducing constituents of the exhaust gas. This can lead to increased nitrogen oxide emission both during the regeneration itself and after the engine has been switched back to lean-burn mode. To eliminate this problem, it is proposed to divide the rich-burn mode into two rich pulses which follow one another in time, the first rich pulse being of shorter duration than the second rich pulse.

6 Claims, 3 Drawing Sheets

U.S. PATENT DOCUMENTS 5,874,057 A * 2/1999 Deeba et al. ............ 423/239.1
2004/0187483 A1 * 9/2004 Dalla Betta et al. ........... 60/286

FOREIGN PATENT DOCUMENTS

| | | |
|---|---|---|
| DE | 198 01 815 A1 | 7/1999 |
| DE | 198 27 195 A1 | 12/1999 |
| DE | 199 18 756 A1 | 10/2000 |
| DE | 199 22 962 A1 | 11/2000 |
| DE | 199 52 830 A1 | 5/2001 |
| DE | 101 16 877 A1 | 11/2001 |
| DE | 100 26 762 A1 | 12/2001 |
| DE | 101 23 148 A1 | 11/2002 |
| DE | 10125 759 A1 | 11/2002 |
| DE | 101 30 053 A1 | 1/2003 |
| DE | 102 02 935 A1 | 8/2003 |
| DE | 10 2004 009 999 A1 | 10/2004 |
| EP | 0 936 349 A2 | 8/1999 |
| EP | 1 386 656 A1 | 2/2004 |
| WO | WO 01/44630 A2 | 6/2001 |

* cited by examiner

METHOD FOR REGENERATION A NITROGEN OXIDE STORAGE CATALYST

CROSS-REFERENCE TO RELATED APPLICATIONS

This application claims the benefit of priority of German Patent Application No. 10 2004 062 596.4 filed Dec. 24, 2004, and International Application No. PCT/EP2005/014030 filed Dec. 24, 2005, both of which are relied on and incorporated herein by reference.

INTRODUCTION AND BACKGROUND

The present invention relates to the regeneration of nitrogen oxide storage catalysts which are used to remove nitrogen oxides from the exhaust gas from lean-burn engines.

To reduce the fuel consumption of petrol engines, what are known as lean-burn engines which are operated with lean air/fuel mixes in the part-load range have been developed. A lean air/fuel mix contains an oxygen concentration which is higher than necessary for complete combustion of the fuel. In this case, the corresponding exhaust gas contains the oxidizing components oxygen ($O_2$), nitrogen oxides (NOx) in excess compared to the reducing exhaust-gas components carbon monoxide (CO), hydrogen ($H_2$) and hydrocarbons (HC). Lean exhaust gas usually contains 3 to 15% by volume of oxygen. However, at full load, lean-burn engines are also operated with stoichiometric or substoichiometric, i.e. rich, air/fuel mixtures.

By contrast, diesel engines generally operate under conditions with highly superstoichiometric air/fuel mixes. Only in recent years have diesel engines which can also be operated with rich air/fuel mixes for a short period of time been developed. Diesel engines, in particular those with the option of rich operating phases, are also encompassed by the term lean-burn engines in the context of the present invention.

What is known as the air/fuel ratio lambda ($\lambda$) is used to characterize the air/fuel mix. This represents the air/fuel ratio standardized to stoichiometric conditions. An air/fuel mix with a stoichiometric composition has an air/fuel ratio of 1. Air/fuel ratios of greater than 1 indicate a lean air/fuel mix, whereas air/fuel ratios of below 1 indicate a rich air/fuel mix. The exhaust gas which leaves the engine has the same air/fuel ratio as the air/fuel mix with which the engine is operated.

On account of the high oxygen content of the exhaust gas from lean-burn engines, the nitrogen oxides contained therein cannot be continuously reduced to form nitrogen, with simultaneous oxidation of hydrocarbons and carbon monoxide, with the aid of three-way catalysts as used in spark-ignition engines operated under stoichiometric conditions. Therefore, what are known as nitrogen oxide storage catalysts, which store the nitrogen oxides contained in the lean exhaust gas in the form of nitrates, have been developed for the purpose of removing the nitrogen oxides from the exhaust gas from these engines.

The operation of nitrogen oxide storage catalysts is described extensively in SAE document SAE 950809. According to this, nitrogen oxide storage catalysts consist of a catalyst material, which has generally been applied in the form of a coating to an inert honeycomb carrier made from ceramic or metal, referred to as a carrier. The catalyst material contains a nitrogen oxide storage material and a catalytically active component. The nitrogen oxide storage material in turn consists of the actual nitrogen oxide storage component, which has been deposited in highly disperse form on a support material. The storage components used are predominantly the basic oxides of the alkali metals, the alkaline-earth metals and the rare earths, but in particular barium oxide, which react with nitrogen dioxide to form the corresponding nitrates.

The catalytically active components used are usually the precious metals from the platinum group, which are generally deposited together with the storage component on the support material. The support material used is predominantly active alumina with a high surface area. However, the catalytically active components may also be applied to a separate support material, which can likewise consist of active alumina.

The role of the catalytically active components is to convert carbon monoxide and hydrocarbons in the lean exhaust gas into carbon dioxide and water. Moreover, they are intended to oxidize the nitrogen monoxide present in the exhaust gas to form nitrogen dioxide, so that it forms nitrates with the basic storage material (storage phase or lean-burn mode), since the nitrogen oxides present in the exhaust gas from lean-burn engines, depending on the operating conditions of the engine, are made up of 65 to 95% by volume of nitrogen monoxide, which does not react with the storage components to form nitrates.

As the accumulation of nitrogen oxides in the storage material increases, the storage capacity of the material decreases. The storage material has to be regenerated from time to time. For this purpose, the engine is briefly operated with air/fuel mixes with a stoichiometric or rich composition (during what is known as the regeneration phase or rich-burn mode). Under the reducing conditions in the rich exhaust gas, the stored nitrates are decomposed to form nitrogen oxides NOx, and reduced to form nitrogen together with water and carbon dioxide. The carbon monoxide, hydrogen and hydrocarbons present in the exhaust gas serve here as reducing agents. The reduction is exothermic and increases the bed temperature of the catalyst by approximately 30 to 50° C. compared to the exhaust gas temperature prior to entry into the catalyst.

During the storage phase or lean-burn mode, the air/fuel ratio is between approximately 1.3 and 5, depending on the type of engine. During the brief regeneration phase or rich-burn mode, the air/fuel ratio is lowered to between 0.7 and 0.95.

When the nitrogen oxide storage catalyst is operating, the storage phase and regeneration phase alternate at regular intervals. The sequence of storage phase and regeneration phase is also referred to hereinbelow as purification cycle. The duration of the storage phase depends on the level of nitrogen oxide emission of the engine and on the storage capacity of the catalyst. In the case of catalysts having a high storage capacity, the storage phase can be 300 seconds and more. However, it is usually between 60 and 120 seconds. The duration of the regeneration phase, on the other hand, is considerably shorter. It is less than 20 seconds.

It is customary for a nitrogen oxide sensor to be arranged downstream of the storage catalyst in order to determine the optimum instant for switching the engine from the storage phase to the regeneration phase. If the nitrogen oxide concentration in the exhaust gas measured by this sensor rises above a preset threshold value, regeneration of the catalyst is initiated.

Modern nitrogen oxide storage catalysts have a working range, based on the exhaust gas temperature upstream of the catalyst, of between approximately 150 and 500° C. This range is also referred to hereinbelow as the activity window. Below the activity window the storage catalyst cannot store the nitrogen oxides contained in the exhaust gas in the form of nitrates, since its catalytically active components are not yet able to oxidize the nitrogen oxides to form nitrogen dioxide.

Above the activity window, the stored nitrates are thermally decomposed and released to the exhaust gas as nitrogen oxides. However, this "thermal desorption" does not occur suddenly above the activity window, but rather starts to occur, in competition with the storage process, even within the activity window.

The nitrogen oxide conversion which can be achieved with a nitrogen oxide storage catalyst, therefore, increases continuously as the bed temperature of the catalyst rises, passes through a maximum at medium temperatures within the activity window and then drops again at high bed temperatures. The position of the activity window and in particular the bed temperature for maximum nitrogen oxide conversion is dependent on the formulation of the catalyst, in particular on the nature of the storage components used. If alkaline-earth metal oxides, such as barium and strontium oxide, are used as storage components, the bed temperature for maximum nitrogen oxide conversion is approximately between 350 and 400° C.

During regeneration of a storage catalyst, there is a risk of the bed temperature of the catalyst during and after regeneration passing into a range in which the incipient thermal desorption considerably reduces the storage capacity of the catalyst on account of the heat which is released during the conversion of the nitrogen oxides by the reducing constituents of the exhaust gas. The inventors have observed that an accelerated release of unconverted nitrogen oxides can occur due to the relatively high temperatures. Furthermore, the inventors have observed that, in the case of specific operating parameters of the engine, the heating of the nitrogen oxide storage catalyst can extend through the regeneration and into the following lean-burn phase. As a result, there is brief slippage of nitrogen oxides through the catalyst, which can be so strong that the engine controller immediately initiates regeneration again.

SUMMARY OF THE INVENTION

It is an object of the present invention to provide a regeneration method which avoids excessive heating of the storage catalyst during the regeneration at exhaust gas temperatures in the range between 150 and 500° C.

This object is achieved by the method according to claims 1 to 6. The method is based on a lean-burn engine which is equipped with an exhaust gas purification system which contains a nitrogen oxide storage catalyst, of which the activity window for the nitrogen oxide storage is between 150 and 500° C. The storage catalyst is regularly regenerated by briefly switching from lean-burn mode of the engine to rich-burn mode.

The method is characterized in that for regeneration of the nitrogen oxide storage catalyst the rich-burn mode is formed from two rich pulses which follow one another with a time interval between them, wherein the first rich pulse is always shorter than the second rich pulse and the time interval between the two pulses is from 2 to 20 seconds.

The purpose of this division of the rich pulse into two rich pulses of different lengths, with a lean-burn phase lasting up to 20 seconds between the two pulses, is to attenuate the rise in the bed temperature of the catalyst caused by the exothermic reaction of the desorbed nitrogen oxides with the reductive constituents of the rich exhaust gas. To achieve this, the first rich pulse must be considerably shorter than the second rich pulse. The short lean-burn phase between the two pulses ensures that the exothermic heat during the first rich pulse can be at least partially dissipated again to the exhaust gas. This is possible because, on account of the exothermic reactions of the catalyst, its bed temperature is greater than the exhaust-gas temperature.

The use of rich pulses for regenerating storage catalysts has already been described in various patents. For example, EP 1 386 656 A1 discloses the regeneration of a storage catalyst using from 2 to 10 successive rich pulses when the exhaust-gas temperature is between 170 and 250° C. The successive rich pulses with lean-burn phases between them is intended to heat the catalyst in order to raise its bed temperature to a range that is favorable for regeneration.

DE 100 26 762 A1 describes a method for desulfating a nitrogen oxide storage catalyst by means of alternating rich and lean exhaust gas. The desulfating of a nitrogen oxide storage catalyst is only possible above a bed temperature of 600° C. This temperature is well above the temperatures that are of relevance to the proposed method.

Patent application DE 198 01 815 A1 describes a method for regenerating a nitrogen oxide storage catalyst using an exhaust gas that oscillates between rich and lean, wherein the exhaust-gas composition is on average of stoichiometric or slightly lean composition. Said patent application does not provide details of the temperatures present in the catalyst during the regeneration.

BRIEF DESCRIPTION OF DRAWINGS

To provide a better understanding, the present invention is explained in more detail with reference to FIGS. 1 to 4, in which.

DETAILED DESCRIPTION OF THE INVENTION

Figure 1:
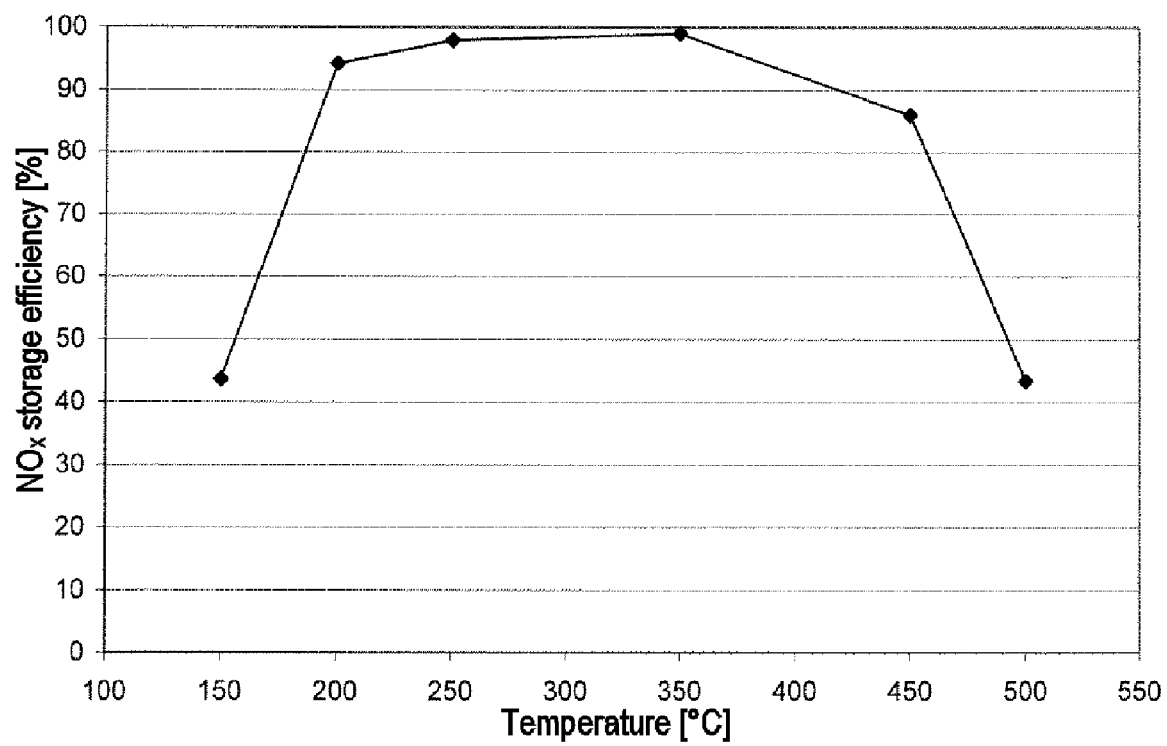
FIG. 1: shows the nitrogen oxide storage efficiency of a nitrogen oxide storage catalyst as a function of the exhaust-gas temperature upstream of the catalyst.

FIG. 1 shows the typical curve for the storage efficiency of a nitrogen oxide storage catalyst as a function of the exhaust-gas temperature upstream of the catalyst during steady-state operation. The activity window of the catalyst for storing the nitrogen oxides is approximately between an exhaust gas temperature upstream of the catalyst of 150 and 500° C. This range may be narrower or wider, or its position shifted, depending on the formulation and ageing state of the catalyst. The optimum working temperature of the catalyst is typically between 300 and 350° C. The storage efficiency decreases at the high-temperature flank of the storage curve, since the nitrogen oxides stored in the form of nitrates are increasingly thermally decomposed at these temperatures.

The incipient thermal desorption resulting from the temperature rise caused by the exothermicity of regeneration is to be attenuated by the regeneration according to the invention using two successive rich pulses. However, the increase in temperature caused by the exothermicity only becomes a problem when the exhaust-gas temperature upstream of the storage catalyst, including the expected temperature rise in the catalyst caused by the regeneration, is greater than the temperature for the maximum storage capacity within the middle of the temperature range of the activity window. The splitting of the rich pulses is not necessary for all exhaust-gas temperatures below this temperature, i.e. the rich phase is only split into two pulses when the exhaust-gas temperature upstream of the storage catalyst, including the expected temperature increase in the catalyst caused by the regeneration, is greater than the temperature for the maximum storage capacity.

Figure 2:
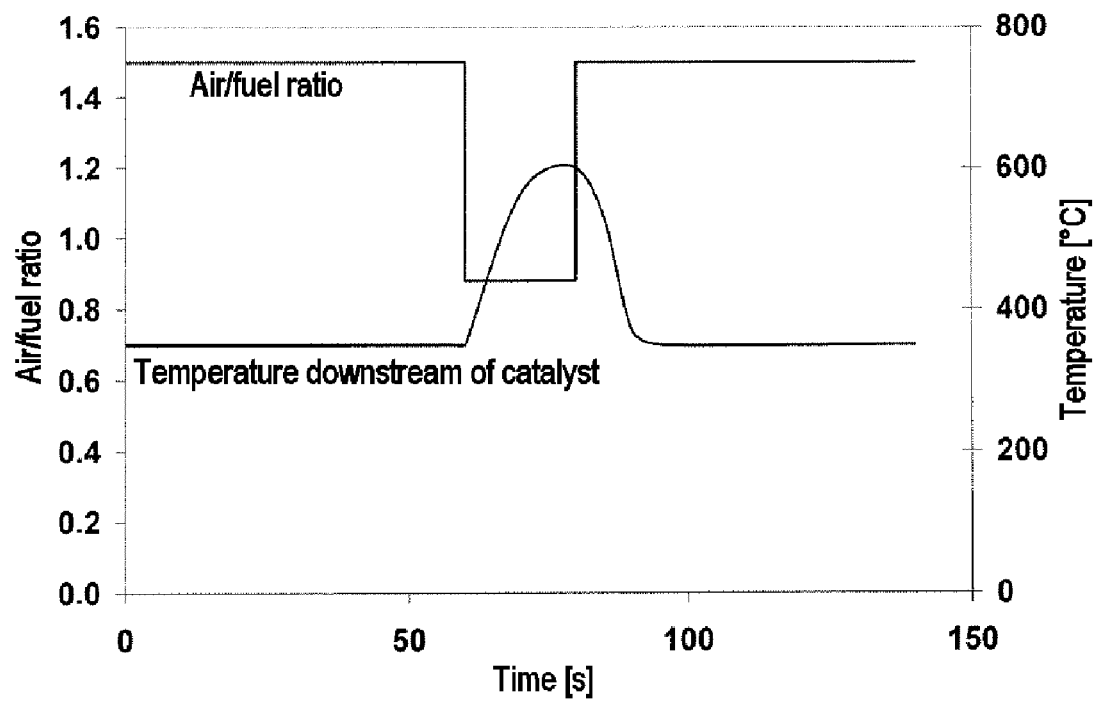
FIG. 2: shows the curve of the air/fuel ratio upstream of the catalyst and the temperature downstream of the catalyst during regeneration in accordance with the prior art.

FIG. 2 shows the curve of the air/fuel ratio and the bed temperature of the catalyst before, during and after regeneration of a storage catalyst. During lean-burn mode, the air/fuel ratio is 1.5. The exhaust gas temperature upstream of the catalyst is 350° C. To initiate regeneration, the air/fuel ratio of the exhaust gas is lowered to 0.88 by enriching the mix and is held at this value for approximately 20 seconds. During rich-burn mode, the stored nitrates are decomposed again to form nitrogen oxides and reacted with the hydrocarbons and carbon monoxide contained in the exhaust gas to form nitrogen, carbon dioxide and water. This reaction is exothermic and leads to a considerable increase in the bed temperature of the catalyst. The temperature may rise to well above the working range of the nitrogen oxide storage catalyst, so that shortly after the regeneration, on account of the high temperature, it is no longer able to store nitrogen oxides. This leads to undesired slippage of nitrogen oxides, which may simulate the need for further regeneration.

Figure 3:
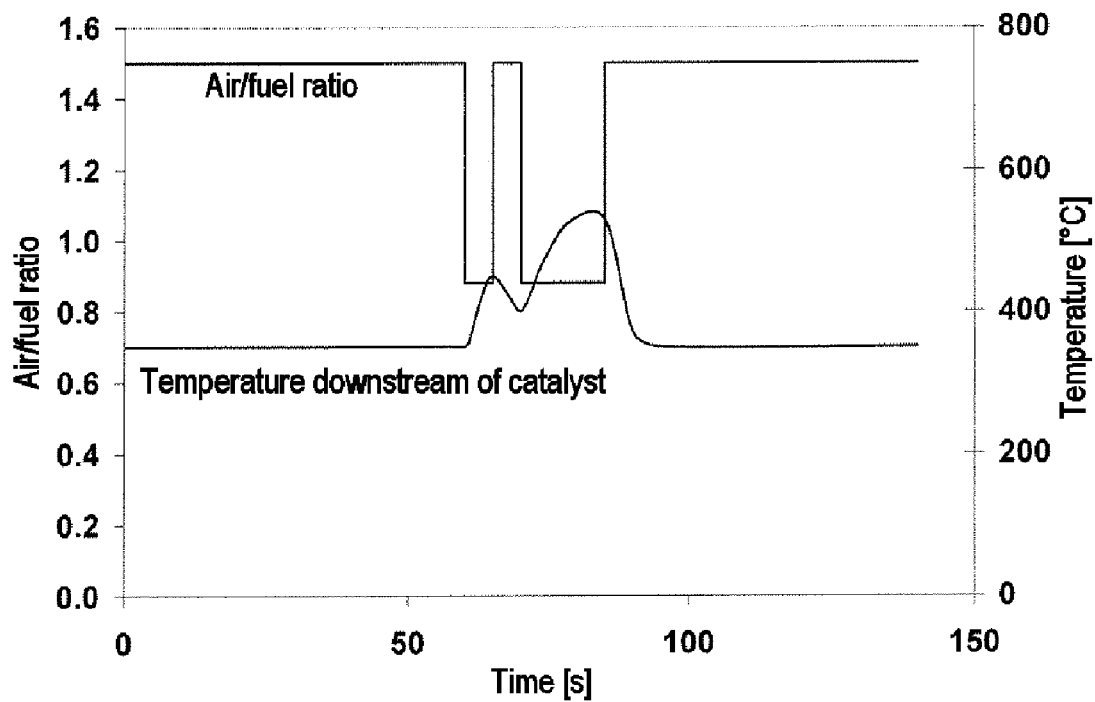
FIG. 3: shows the curve of the air/fuel ratio upstream of the catalyst and the temperature downstream of the catalyst during regeneration in accordance with the invention with two rich pulses with a time interval between them.

FIG. 3, by contrast, shows the curve for air/fuel ratio and bed temperature of the catalyst in accordance with the proposed method. By way of example, in FIG. 3 the regeneration time of 20 seconds is split into two rich pulses of 5 and 15 seconds. The interval between the two rich pulses in FIG. 5 is 5 seconds. During this short time, the engine is again operated with lean exhaust gas. As the temperature curve downstream of the catalyst, which is likewise illustrated, demonstrates, during the first rich pulse the temperature rises considerably as a result of the exothermic regeneration, in precisely the same way as in FIG. 2. However, the brief lean-burn mode between the two rich pulses is sufficient to lower the temperature of the catalyst after the first rich pulse to a sufficient extent for the temperature rise during the remaining regeneration not to stray beyond the working range of the catalyst. Therefore, the catalyst is ready to store the nitrogen oxides again immediately after the regeneration has ended.

According to the invention, the duration of the first rich pulse is always selected to be shorter than the duration of the second rich pulse. It is preferable for the ratio of the duration of the first rich pulse to the duration of the second rich pulse to be in the range between 0.01 and 0.9, preferably between 0.01 and 0.5 and in particular between 0.1 and 0.5, with the total duration of the two rich pulses being between 5 and 30 seconds. To ensure sufficient cooling of the catalyst between the two rich pulses, the time interval between the two rich pulses should be between 2 and 20 seconds.

The method can be used both for exhaust-gas purification systems of motor vehicles which have only one nitrogen oxide storage catalyst, in the underbody region of the vehicle, and for exhaust-gas purification systems which have a nitrogen oxide storage catalyst as starting catalyst and a further nitrogen oxide storage catalyst in the underbody region of the vehicle. In this case, the ratio of the duration of the first rich pulse to the duration of the second rich pulse is matched to the ratio of the storage capacities of the two catalysts, with the total duration of the two rich pulses being between 5 and 30 seconds and the time interval between the two rich pulses being between 5 and 30 seconds.

EXAMPLE

The following example measures the HC and $NO_x$ conversion at a lean-burn spark-ignition engine with direct petrol injection. The tests were carried out on an engine test bench. The exhaust-gas purification system comprised a starting catalyst arranged close to the engine and a nitrogen oxide storage catalyst. The length of the exhaust pipe between starting catalyst and storage catalyst was 1 m. The $NO_x$ storage efficiency of the storage catalyst was dependent on the exhaust-gas temperature prior to entry to the catalyst as shown in FIG. 1.

Before the measurements commenced, the engine and exhaust-gas purification system were conditioned for approximately one hour. This conditioning comprised a plurality of purification cycles, each with a total duration of 330 seconds. Each purification cycle comprised a lean-burn phase (storage phase) of 300 seconds and a rich-burn phase (regeneration phase) lasting 30 seconds. The rich-burn phase was in each case formed from just one continuous rich pulse. The air/fuel ratio λ of the exhaust gas was measured using a wide-band lambda sensor prior to entry to the starting catalyst. The air/fuel ratio was approximately 2.2 during the lean-burn phases and 0.87 during the rich-burn phases. The exhaust-gas temperature upstream of the storage catalyst was approximately between 305 and 310° C. prior to commencement of the respective rich-burn phases.

Figure 4:
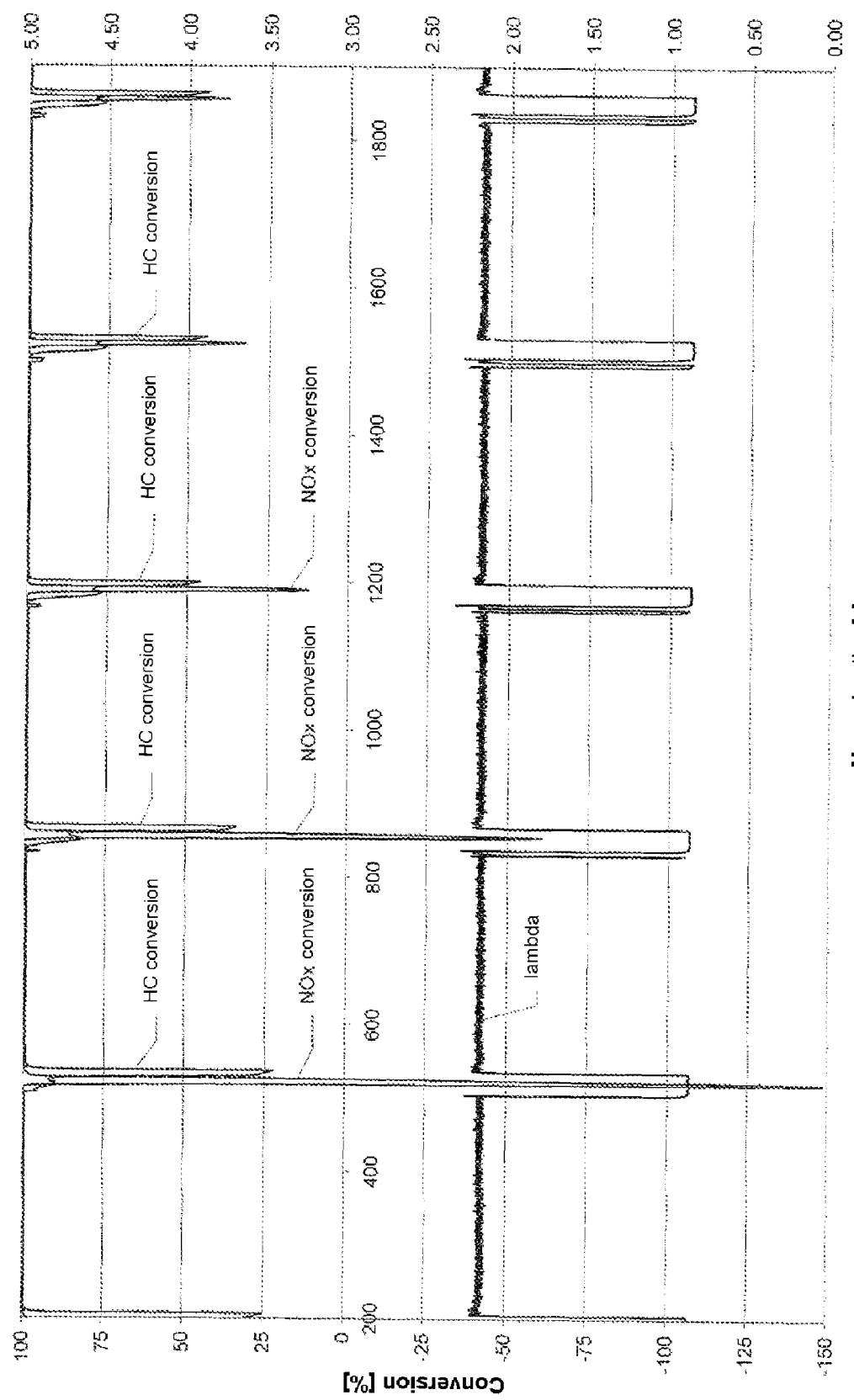
FIG. 4: shows $NO_x$ conversion and HC conversion for a vehicle with nitrogen oxide storage catalyst.

After the conditioning of the system made of engine and exhaust-gas purification system had ended, the $NO_x$ conversion, HC conversion and air/fuel ratio were measured every tenth of a second. FIG. 4 shows an excerpt from the measurements between 200 and 1900 seconds. This excerpt comprises 5 purification cycles. The first complete purification cycle in FIG. 4 starts with a lean-burn phase followed by a conventional rich-burn phase without the rich pulse being split. In the following four purification cycles, the rich pulse of the rich-burn phase was, in accordance with the invention, split into in each case one short and one long rich pulse, without changing the total duration of the rich-burn phase. Therefore, for all the rich-burn phases, the total duration of the two rich pulses was in each case 30 seconds. The time interval between the two rich pulses was in each case 5 seconds. The duration of the first rich pulse was varied between 1 and 5 seconds. To provide a better understanding, the time curve of the five purification cycles illustrated in FIG. 4 is compiled in summary form below:

| | |
|---|---|
| First purification cycle (regeneration with one continuous rich pulse): | |
| Lean running time before regeneration commences: | 300 s |
| Duration of the rich pulse: | 30 s |
| Second purification cycle (regeneration according to the invention with two rich pulses): | |
| Lean running time before regeneration commences: | 295 s |
| Duration of the first rich pulse: | 1 s |
| Duration of the lean-burn phase between the pulses: | 5 s |
| Duration of the second rich pulse: | 29 s |
| Third purification cycle (regeneration according to the invention with two rich pulses): | |
| Lean running time before regeneration commences: | 295 s |
| Duration of the first rich pulse: | 3 s |

-continued

| | |
|---|---|
| Duration of the lean-burn phase between the pulses: | 5 s |
| Duration of the second rich pulse: | 27 s |
| Fourth purification cycle | |
| (regeneration according to the invention with two rich pulses): | |
| Lean running time before regeneration commences: | 295 s |
| Duration of the first rich pulse: | 5 s |
| Duration of the lean-burn phase between the pulses: | 5 s |
| Duration of the second rich pulse: | 25 s |
| Fifth purification cycle | |
| (regeneration according to the invention with two rich pulses): | |
| Lean running time before regeneration commences: | 295 s |
| Duration of the first rich pulse: | 5 s |
| Duration of the lean-burn phase between the pulses: | 5 s |
| Duration of the second rich pulse: | 25 s |

During the continuous rich pulse of the first purification cycle, a strong, sudden $NO_x$ emission occurs after about half the rich-burn phase. The $NO_x$ conversion drops from close to 100% to −150%. After about 10 seconds, this sudden $NO_x$ emission ends again. The negative conversion during the $NO_x$ pulse means that more nitrogen oxides emerge from the storage catalyst than flow into the storage catalyst as a result of the exhaust gas. The reason for this presumably lies in the additional heating of the storage catalyst caused by the exothermic reactions during regeneration. As a result, the temperature of the catalyst moves into a range in which, in addition to the desorption of the nitrogen oxides as a result of the rich exhaust gas thermal desorption of nitrogen oxides occurs.

The large quantity of nitrogen oxides released as a result clearly can no longer be reacted by the catalyst with the reductive constituents of the exhaust gas. A likewise sudden drop in the HC conversion is observed after the $NO_x$ pulse has ended. The reason for this is that the storage catalyst has been virtually completely regenerated after the sudden $NO_x$ pulse and therefore nitrogen oxides are no longer available to react the reductive constituents of the exhaust gas during the rich pulse.

The following four purification cycles with split rich pulses according to the invention show that this split allows the sudden emission of $NO_x$ to be reduced. It is clear that the lean-burn phase lasting 5 seconds between the two rich pulses is sufficient to limit the temperature rise of the catalyst. In this example, optimum results were achieved in the last two purification cycles with the first rich pulse lasting 5 seconds. Simultaneously with a reduction in the $NO_x$ emission during the sudden $NO_x$ pulse, the conversion of the reductive components of the exhaust gas also improves, as can be recognized from the improved HC conversion in FIG. 4.

FIG. 4 also shows that the overall purification action of the exhaust-gas purification system can be improved by using the method according to the invention for regenerating a storage catalyst. Further improvements to the exhaust-gas purification can be achieved by suitably adapting the duration of first and second rich pulses and also of the lean-burn phase between the two rich pulses.

The invention claimed is:

1. Method for regenerating a nitrogen oxide storage catalyst in the exhaust-gas purification system of a vehicle having a lean-burn engine, the storage catalyst having an activity window for the nitrogen oxide storage between 150 and 500° C., comprising contacting exhaust gas from the lean-burn engine with the nitrogen oxide storage catalyst and regenerating the catalyst within the activity window by briefly switching the lean-burn mode to rich-burn mode, forming the rich-burn mode from two rich pulses comprising a first rich pulse and a second rich pulse, passing the first rich pulse followed by the second rich pulse in contact with the nitrogen oxide storage catalyst with a time interval between them, the first rich pulse always being shorter than the second rich pulse and the time interval between the two rich pulses being 2 to 20 seconds.

2. The method according to claim 1, wherein the nitrogen oxide storage capacity of the storage catalyst passes through a maximum at medium temperatures within the activity window, and the rich-burn mode is only split into two pulses when the exhaust-gas temperature upstream of the storage catalyst, including the expected temperature increase in the catalyst caused by regeneration, is greater than the temperature for the maximum storage capacity.

3. The method according to claim 1, wherein the ratio of the duration of the first rich pulse to the duration of the second rich pulse is in the range between 0.01 and 0.9, with the total duration of the two rich pulses being between 5 and 30 seconds.

4. The method according to claim 1, wherein the exhaust-gas purification system includes a nitrogen oxide storage catalyst in an underbody region of the vehicle.

5. The method according to claim 1, wherein the exhaust-gas purification system includes a nitrogen oxide storage catalyst as starting catalyst and a further nitrogen oxide storage catalyst in the underbody region of the vehicle, with each of the catalysts having its own maximum storage capacity.

6. The method according to claim 1, wherein the ratio of the duration of the first rich pulse to the duration of the second rich pulse corresponds to the ratio of the storage capacities of the two catalysts, with the total duration of the two rich pulses being between 5 and 30 seconds and the time interval between the two rich pulses being between 5 and 20 seconds.

* * * * *